FIG_7_

FIG_8_

FIG_9_

FIG_10_

FIG. 12.

United States Patent Office 3,008,144
Patented Nov. 14, 1961

3,008,144
COMPONENT INSERTING MACHINE
Robert A. Fryklund, Dedham, Mass., assignor to International Business Machines Corporation, New York, N.Y., a corporation of New York
Filed Dec. 30, 1957, Ser. No. 705,933
7 Claims. (Cl. 1—323)

This invention relates to inserting machines and in particular to a machine for the insertion of electrical components into an apertured board.

It is therefore an object of this invention to provide an improved inserting machine.

It is a further object of this invention to provide an inserting machine for electrical components wherein each component is individually selected for each insertion.

Another object of this invention is to provide an inserting machine wherein each selectable component is positioned for insertion in a common location.

A further object of this invention is to provide a forming apparatus for the leads of each component selected.

Another and further object of this invention is to provide a crimping anvil for the selected component after insertion.

Still another object of this invention is to provide a positionable mechanism for the apertured board.

Other objects of the invention will be pointed out in the following description and claims and illustrated in the accompanying drawings, which disclose, by way of examples, the principle of the invention and the best mode, which has been contemplated, of applying that principle.

In general, the machine comprises an inserting head 10 which operates to pick the selected component, form it into the necessary shape and insert it into the board 11. Placed on the sides of the inserting head are component selector magnets 12, FIG. 3, and component magazines 13. This structure operates together in order to select the desired component for the desired position on the board. By a suitable electric circuit, not shown, a particular selector magnet 12 is energized. This particular magnet operates in a manner to be described hereafter to withdraw a component from one of the magazines 13. The component is held in a space between the magazines. An inserting head, not shown in FIG. 1, and moved by air cylinder 30, moves in this space and operates when moved in a downward direction to secure the selected component and form the leads into the desired shape in cooperation with other apparatus. The board 11, mounted in a suitable structure, is moved to the coordinate position at which the particular component selected is to be inserted. This is done prior to the movement of the inserting head. After the component is inserted into the board 11, a crimping device below the inserting head moves to bend the leads and secure the component to the board.

Figure 1:
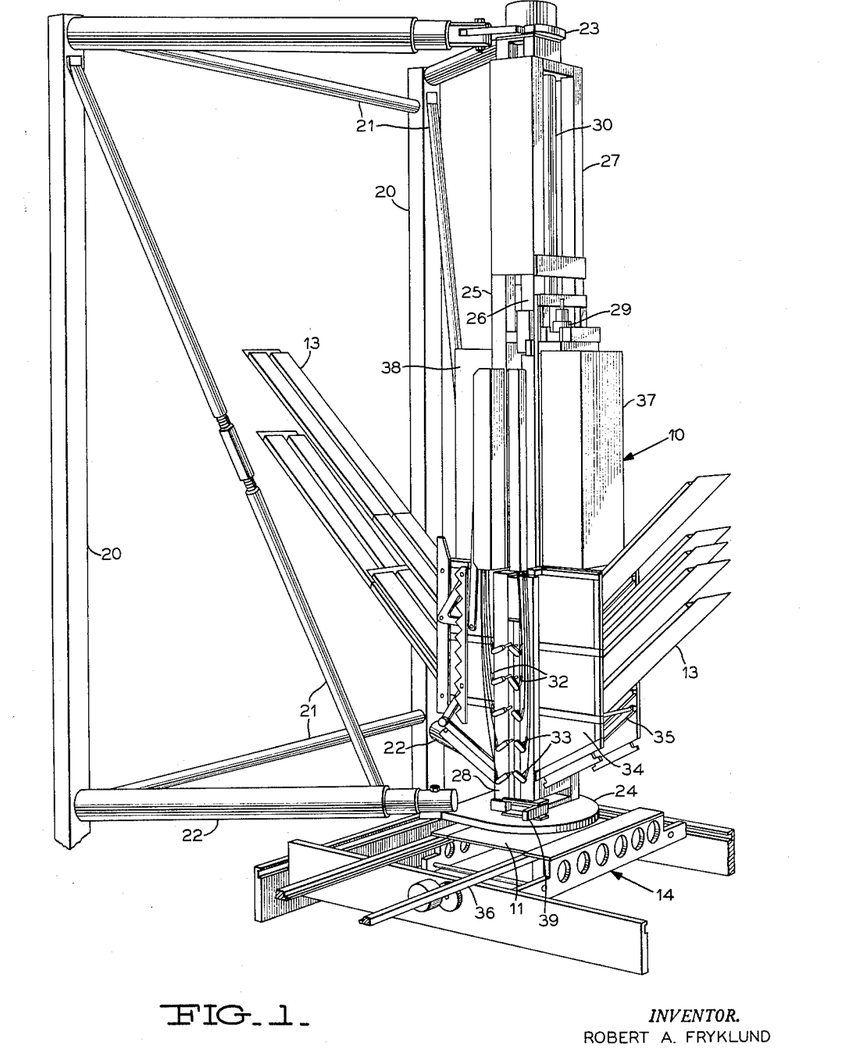
FIG. 1 is an isometric view of the inserting machine.

The inserting head 10 is shown held in position by vertical supports 20 and braces 21 with a series of horizontal adjustable mounting bars 22 which are attached to the horizontal support plates 23 and 24 at the top and bottom portion of the head 10, respectively. The inserting head 10 is made up of four main pieces 25—28 held together by suitable plates. The bottom portion of the two supports 26 and 27 are pivotably mounted to swing open to allow inspection of the interior of the inserting head 10. A latch 39, shown at the bottom, provides for securing the pivoted members 26 and 27 to the stationary members 25 and 28 when operating the machine.

Air cylinders 29 and 30 are shown as part of the inserting head and are used to control operation of the mechanical components to be described hereinafter. On each side of the inserting head is a cover plate 37 and 38 for the selector magnets 12 which operate to select the component to be inserted. From the selector magnets through a suitable mechanism a plurality of select wires 32 are attached to a like plurality of crank arms 33. Directly below the selector magnets 12 are side frames 34 containing support blocks 35 placed in a diagonal arrangement and forming slots therebetween for receiving magazines 13 containing the components to be selected.

The component magazines 13 are shown of different lengths to allow for additional components of one variety or another as desired. These magazines are freely insertable into the side frames at any time. By a series of coded selection plates on each side of each magazine identifying the component contained therein and contacts formed on the inside of the slots in the side frames the position of any individual component is rendered immaterial insofar as the selection process goes.

In operating to select and place components in an apertured board, the board is first received in the horizontal guide rails 36 and is locked in position. When this has been done, a selection magnet 12 is operated to drop one of the components from the selected magazine 13 into a channel between the opposing magazines. At the same time, positionable table 14 is moved to a predetermined coordinate position to move the apertured board to a similar position. When this has been accomplished, the air cylinder 30 is operated and a ram is moved through the center portion of the inserting head to pick up the component in the channel, bend the leads of the component to the desired configuration and force the component into the board at the selected component coordinate position. Suitable apparatus to be described hereinafter is positioned directly beneath the inserting head to crimp the protruding leads of the component against the bottom portion of the apertured board 11 to insure a suitable locking.

Figure 2:
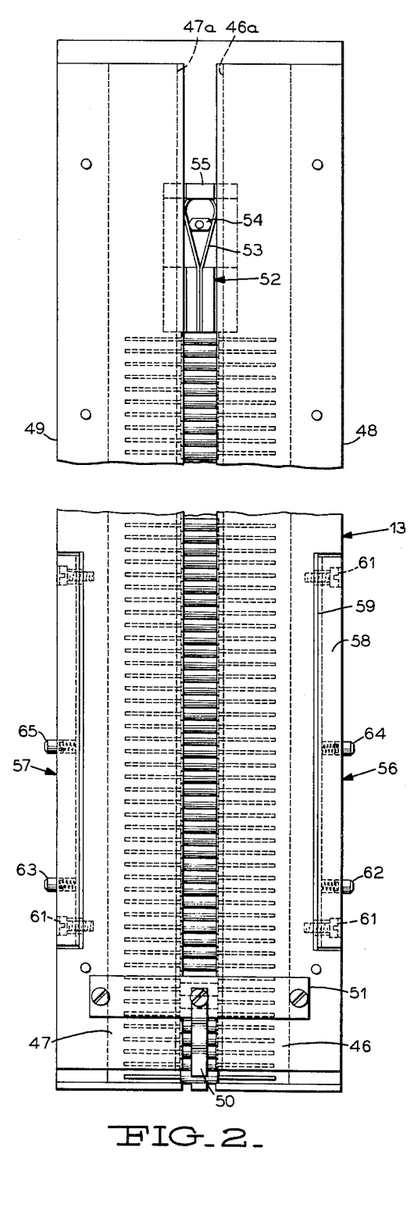
FIG. 2 is a top plan view of a component magazine.
Figure 3:
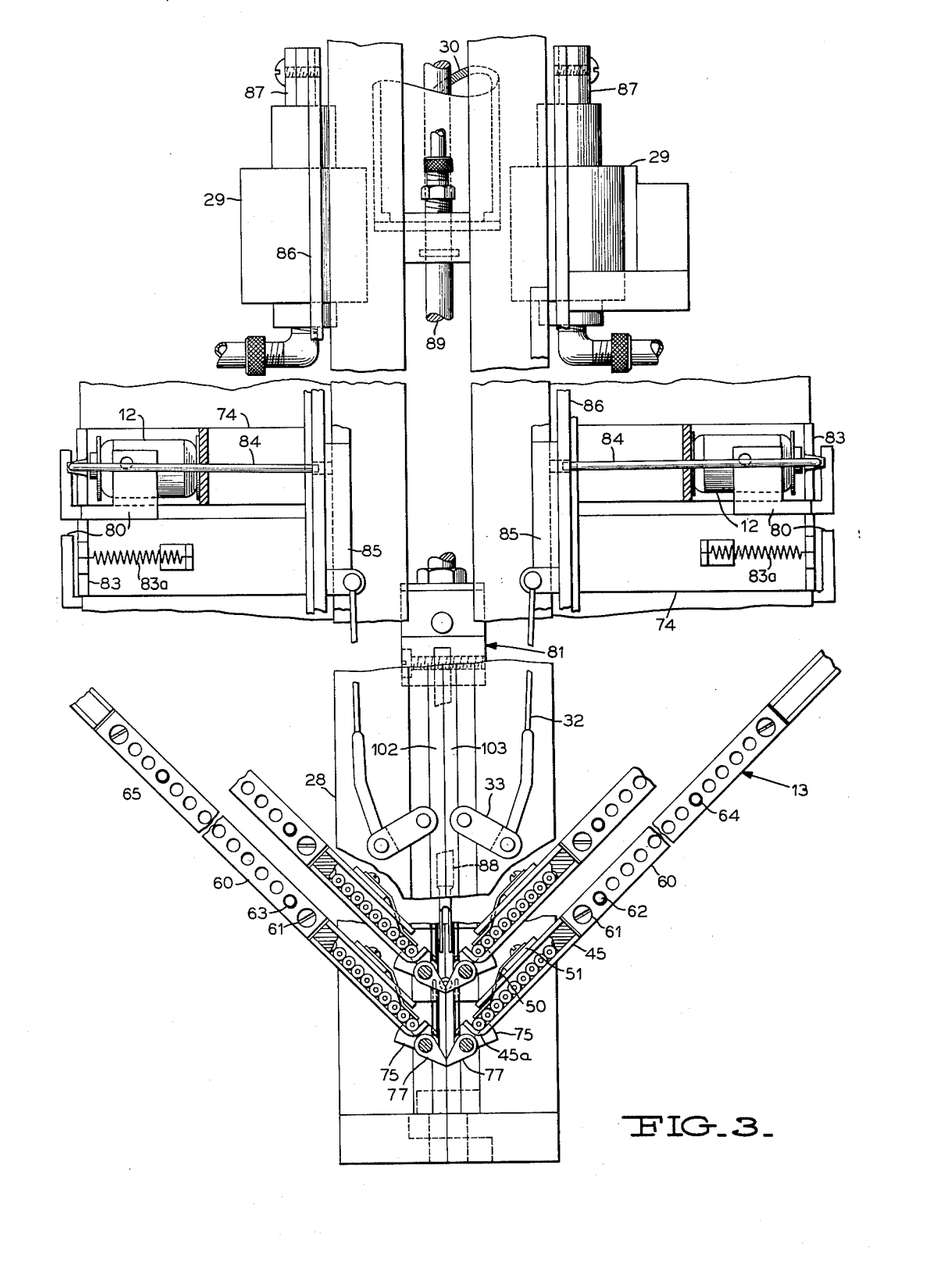
FIG. 3 is a side elevation of the inserting head with the bottom portion broken away.

The component magazine shown in FIGS. 2 and 3 consists of a bottom plate 45 curved at one end and top plates 46 and 47 secured in spaced relation by means of spacers 48 and 49 along the sides thereof so that the curved end portion 45a of the bottom plate 45 projects beyond and leaves a space between the upper tip of the curved portion 45a and the lower edges of the top plates 46 and 47. A spring 50 is fastened to a plate 51 secured to the top plates 46 and 47 and spacers 48 and 49 and overlies the opening to about half the distance. The components are inserted through an opening in the back of the magazine and are held in the center thereof by the formed perpendicular pieces 46a and 47a of the top plates 46 and 47 of the magazine 13. This spacing between the top plates 46 and 47 serves to align the components and to provide a guide for a component weight 52 placed at the rear as shown in FIG. 2. The component weight is made of a formed piece with a longitudinal aperture in the front portion thereof into which a spring wire 53 is inserted. An adjustable member 54 operates to bias the sides of spring 53 against the sides 46a and 47a of the upper plates. A rear projection 55 extends upward between sides 46a and 47a to keep the weight 52 in line and also serves to act as an end holder for the spring 53.

On each side of the component magazine a recessed portion is provided for code plate assemblies 56 and 57. Each assembly is formed of a nonconducting rectangular container 58 with a silver strip 59 placed in the bottom portion with an upper outer plate 60, FIG. 3, having apertures formed therein. The assemblies are held to the magazines by screws 61. The number of apertures in the outer plates can vary in accordance with the number of magazines to be selected but in this instance there has been chosen fifteen. Spring-biased contacts 62 and 63 are placed at the lowermost portion on each side and in contact with the silver strip 59. Further contacts 64 and 65 are placed on each side at different or similar locations and are also connected to the silver strip. The positions of the upper opposite contacts 64 and 65 determine the nature of the component placed in the magazine. This is utilized in cooperation with the selector magnets in order that the particular component desired can be selected no matter which slot contains the slide or magazine. Details of this operation will be reserved until a later description.

Figure 4:
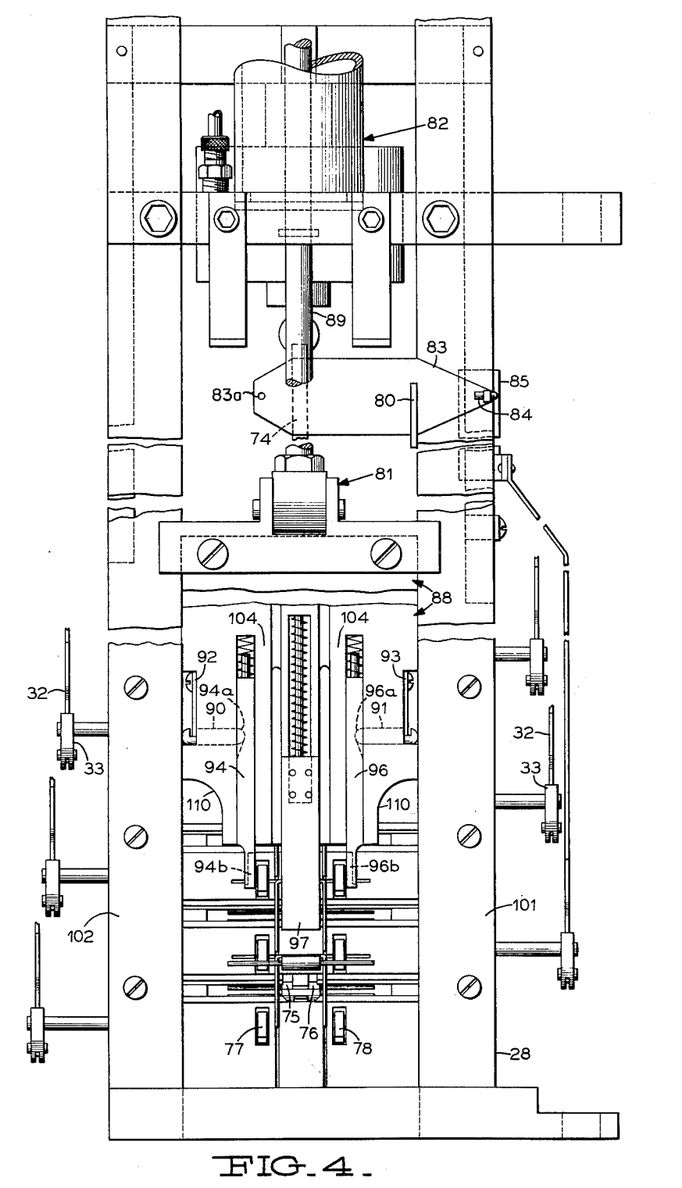
FIG. 4 is a front elevation of the inserting head broken away at the bottom portion to show the internal structure.

FIG. 3 is a side view of the inserting head 10 with the lower portion of the head cut away to show details of the component magazines 13 within the operating area of the inserting head. As shown at the bottom of FIG. 3, the component slides 13 are inserted at an angle and overlie a pair of selecting pawls 75 and 76 contained in the inserting head, see also FIG. 4. As mentioned previously, the bottom portion of the component magazine 13 is cut away at the forward edge so that the selecting pawls 75 and 76, when operated, will move in a direction to contact the lowermost component and push this component into the operating area of the inserting head. The restraining spring 50 will be moved aside by the force of the selecting pawl on the component. Holding fingers 77 and 78, see also FIG. 4, are placed on a similar center in the inserting head and are spring biased toward the center of the operating area so that the component, when moved by the select pawls 75 and 76, will fall to a position wherein the holding fingers straddle the body of the component as shown particularly in FIG. 4. The component is then ready for insertion into the apertured board. This operation takes place generally by means of component fingers 97 on the lower portion of the ram 81 which is shown partly in full and partly in dotted lines in FIGS. 3 and 4 and extends longitudinally upward to the piston assembly 82 which furnishes the motive power to drive the inserting fingers in a downward direction.

The selecting magnets 12 are mounted by suitable mechanical means to the upper side portion of the inserting head. Each magnet has an armature, FIGS. 3 and 4, pivoted at 74 and biased by a spring 83a and having an interposer 84 pivotally mounted on the outside end of armature 83 as shown in FIGS. 3 and 4.

Ordinarily, the armatures 83 and interposers 84 are spring biased in an outward direction to an inoperative status. Each interposer 84 is held in an actuating slide 86 and moves each time that the slides 86 are moved. The slides 86 are attached to piston rods 87 of air pistons 29. For each interposer 84 there is a select slide 85 containing an aperture in corresponding positions to the apertures in slides 86. When a magnet is energized, the interposer moves into the slide 85 which, when the piston 29 is operated, causes movement of the corresponding select slide 85.

The selecting slides 85 remain stationary until the magnet with which they are associated is operated. Attached to the selecting slide 85 is the selecting wire 32 which in turn is attached to a crank arm 33 which operates the select pawls 75 and 76 by virtue of the shaft which extends through the holding fingers 77 and 78 but is rigidly secured to the pawls. The holding fingers 77 and 78 are freely mounted on the crank arm shafts and are spring biased toward the center of the operating area. When the actuating slide 86 is moved in an upward direction after an interposer is moved through the series of apertures to the select slide 85, the component contained in the magazine placed in that particular slot to which the select pawl is associated will be moved into the operating area.

The ram 81 has formed on its lower portion thereof a mechanism for grasping the components held by the holding fingers 77 and 78 and performing a series of operations thereon. The ram, FIG. 4, has a main body portion 88 which is connected directly to the piston rod 89 of piston 82 and moves with the piston rod. In the lower portion of ram 81 two camming pins 90 and 91 are mounted which are biased in an inward direction by springs 92 and 93. As the ram 81 moves between members 101 and 102, FIG. 4, of which there are corresponding members 103, FIG. 3, on the opposite side, the camming pins will be held from outward movement. When the camming pins reach a point adjacent the plate 24, FIG. 10, the members 101, 102, etc., terminate and the pins can be forced from their notches for reasons to be presently explained. These camming pins extend inwardly to a notch 94a and 96a formed in a pair of spring biased fingers 94 and 96 which terminate in outside forming jaws 94b and 96b for the component leads. In the center of the ram head the component select fingers 97 are mounted in a slot and are spring biased in a downward direction. As shown in FIG. 4, a component is standing between the holding fingers in the operating area and is about to be selected by the fingers 97.

Figure 5:
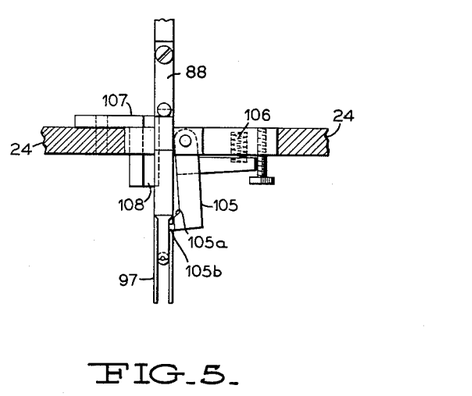
FIG. 5 is a side elevation of the terminal forming apparatus.
Figure 6:
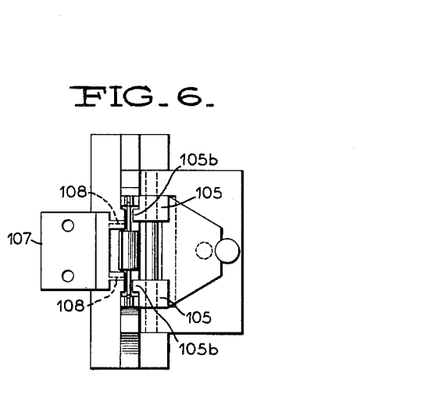
FIG. 6 is a bottom plan view of the terminal forming apparatus.

Directly below the holding sides 102, 103, etc., of the pawl pins and attached to plate 24 is a forming arrangement consisting, see FIGS. 5 and 6, of a pair of inside forming fingers 105 biased by spring 106 toward the operating area of the ram slide. A portion of these fingers 105b, FIG. 6, project inwardly and underlie the component leads of the component selected by the selecting fingers 97. On each finger is provided a tapered shoulder 105a which is adapted to be contacted by the main body of the slide as it moves downward. A centering arrangement 107 for the component is provided on the opposite side of the forming fingers and comprises tapered fingers 108 between which the body of the component is moved to the narrowest width.

Reference to FIGS. 7 through 10 illustrates the complete operation of the component lead forming, and crimping anvil placed beneath the inserting head.

Figure 7:
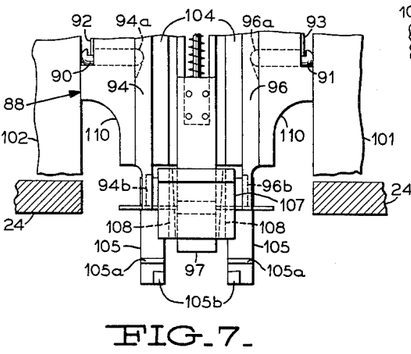
FIGS. 7 through 9 show sequential positions of the component selection slide and the terminal forming apparatus.

In FIG. 7 the ram head 88 is shown with the spring fingers 97 holding a component after it has been stripped from the holding fingers 77 and carried on each side on the forming jaws. The cam pins 90 and 91 are kept in their innermost position by the walls of the slide 102, 103, etc., so that there is no relative movement between portions of the ram head. The centering arrangement 107 is now centering the component.

Figure 8:
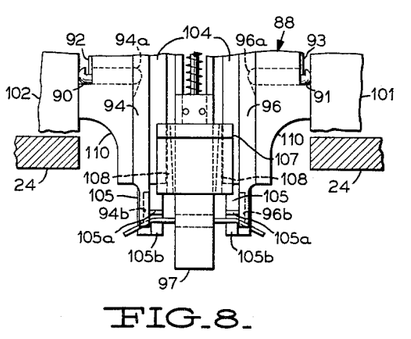

In FIG. 8 the ram head has progressed to a point wherein the forming jaws 94b and 96b and the forming fingers 105 are coacting to bend downward the outer extremities of the component leads. As noted here, the forming jaws have a slot portion therein for containing the bent portion of the component terminal ends therein.

Figure 9:
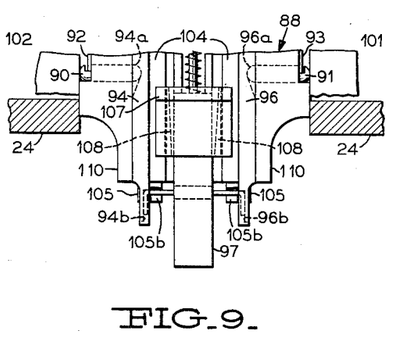

FIG. 9 shows the component leads completely formed in the slots in the forming jaws with the restraining fingers still grasping the component leads. At this time, see also FIG. 5, the main body portion of the ram head 88 is contacting the tapered surface 105a of the restraining finger arms to cam the restraining fingers back out of the way of the component leads and allow for free travel in a downward direction.

Figure 10:
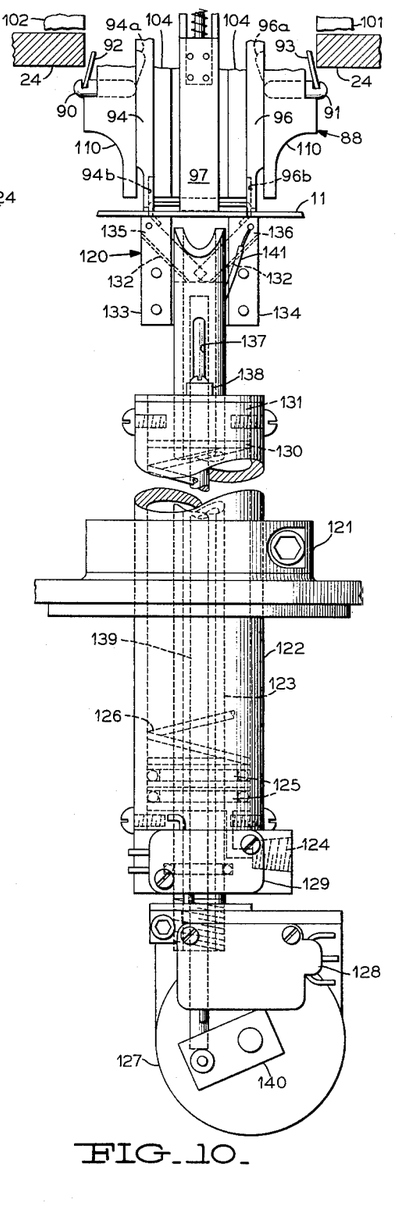
FIG. 10 is a side elevation of the terminal crimping apparatus.

FIG. 10 shows that the camming pins have been released by the walls 102, 103, etc., having been terminated and the outer portion 110 along with the inner portion 104 of the ram head 88 have moved downward and pushed the component toward the end of the spring fingers 97. The component forming jaws 94b and 96b along with the select fingers 97 have moved upward against the bias of the springs to allow them to retract as the component is forced into the printed circuit board through the holes therein. The inner portion 104 of the ram head 88 is accurately fitted to move the body of the component in direct contact with the printed circuit board and at the same time to strip the component leads from the forming jaws.

FIG. 10 discloses the crimping anvil 120 of the present invention which is used to turn the component leads underneath the circuit board 11 shown between the anvil 120 and under the ram head 88. This apparatus is held in a supporting block 121 with a tubular member 122 secured therein which acts as the motion producing means for the forming anvil 120. Contained inside the tubular member 122 is a piston rod 123 which is a coaxial cylinder which moves up and down in accordance with the air pressure introduced at a port 124 below the piston gaskets 125 secured to rod 123. A spring 126 biases the rod 123 to a lowered position in the absence of air pressure. Attached to the lower end of the piston rod 123 is a rotary solenoid 127 mounted on a plate which carries a switch 128 for sensing the position of the rotary solenoid. Attached to the end of the member 122 is another switch 129 for sensing the position of the piston rod 123. The piston rod 123 extends through the upper gasket 130 and end piece 131 of the piston 122 and terminates at the top portion with slots 132 formed on opposite sides thereof. On the same side are attached two parallel plates 133 and 134. A pair of angularly disposed crimping pieces 135 and 136 are pivoted in the parallel plates. The crimping jaws 135 and 136 are freely movable in the slotted openings 132 of the piston rod 123. A groove 137 is formed on the outer peripheral surface of the piston rod 123 and cooperates with a pin attached to the upper end of the piston 122 for maintaining the piston rod in aligned relation. A solid rod 139 traverses the inner portion of the piston rod 123 and is loosely held by the rotary solenoid armature 140, which, when actuated, moves the solid rod in an upward direction to strike the bottom portions of the crimping jaws 135 and 136.

The action of the assembly is as follows: When it is desired to insert a component the piston rod 123 is moved upward by means of air pressure at 124 until the forming jaws 135 and 136 are positioned directly beneath and in contact with the apertured board 11. The component carried by the forming fingers 94b and 96b is pushed in a downward direction through the holes in the apertured board 11. The component leads strike the inclined surface of the crimping jaws to bend the component leads in an inward direction. A circuit is completed by the component and the crimping jaws by means of the wires 141, only one shown, to indicate that the component is through the board. The rotary solenoid 140 is then operated to move the driving rod 139 in an upward direction to move the crimping jaws 135 and 136 to a position parallel to the board 11 to crimp the component leads solidly to the board.

Figure 11:
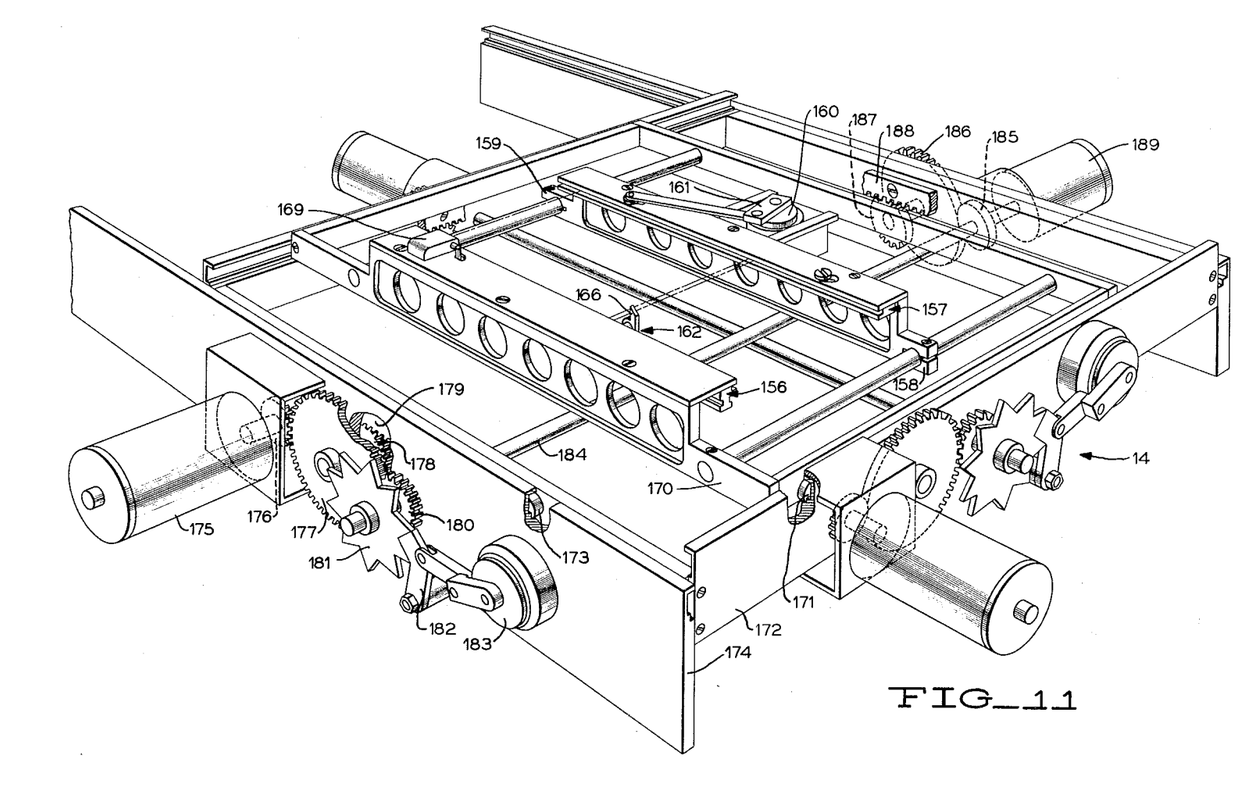
FIG. 11 is an isometric view of the positioning apparatus for the apertured board.

The isometric view of FIG. 11 illustrates how the printed circuit board is moved to any coordinate position.

Initially the board 11 is inserted in the parallel guides 156 and 157 containing positioning grooves. The guides are adjustable by means of clamps 158 and 159 to allow for apertured boards of various dimensions to be accepted. Attached to the outer guide 157 is a rotary solenoid 160 containing a crank arm 161 connected to the armature for moving the lower portion of the guide in a longitudinal angular direction to allow for easy insertion of the board but positive holding after the board once has been inserted.

Figure 12:
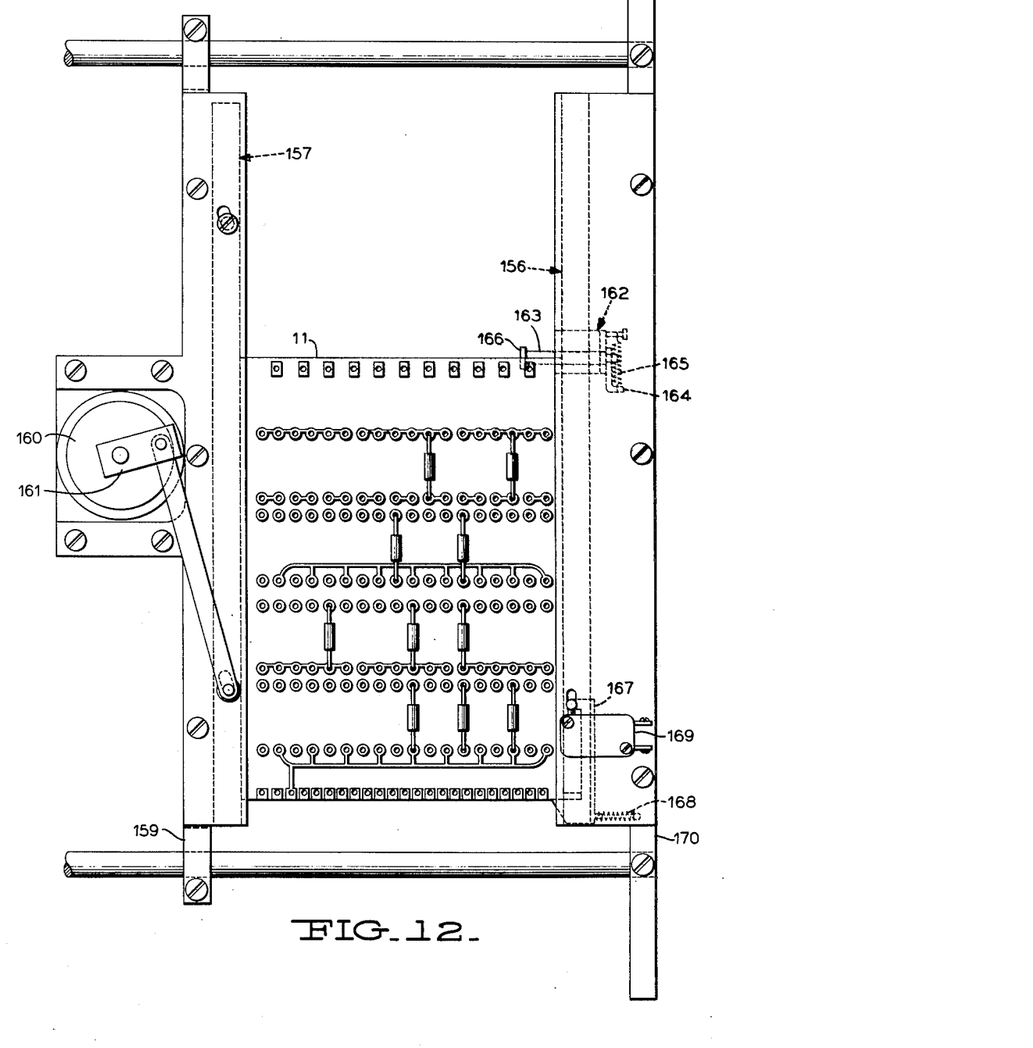
FIG. 12 is a top plan view of the positioning apparatus with apertured board contained therein.
Figure 13:
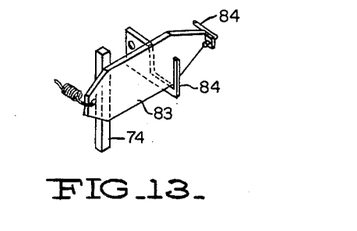
FIG. 13 is an isometric view of the armature and related structure of the component selecting mechanism.

A positioning mechanism 162, see FIG. 12, is positioned beneath rail 156. The mechanism 162 contains a shaft 163 having a crank arm 164 secured thereto with which a spring 165 cooperates to bias a stop 166 to a perpendicular position to resiliently contact the leading edge of board 11. A latch 167 is pivoted beneath rail 156 and spring biased to hold the board 11 in position after insertion into the rails 156 and 157. When it is desired to remove the board, the stop 166 is cammed aside by a positive movement of the board. A switch 169 is mounted above rail 156 for sensing the presence of a board in the rails.

The coordinate motion of board 11 is accomplished by mounting the inner guides 156 and 157 on a supporting arrangement 170 of rectangular configuration having rollers 171 mounted on opposite sides for sliding in the inner portion of a rectangular support 172. This last-mentioned rectangular support is similarly mounted by means of rollers 173 in guide ways formed on the inside periphery of a support 174.

For movement from left to right, a motor 175 is energized and the driving gear 176 rotates in one direction or the other in mesh with a reduction gear 177 which is connected in turn to a rack gear 178 which meshes with the rack teeth 179 formed on the underside of the rectangular movable support 172 so that rotation of the motor will be positively transformed into movement of the outer rectangular support 172. Also connected to the reduction gear 177 is another driven gear 180 which drives a detent wheel 181 containing a plurality of serrations therein. A detent pawl 182 spring biased toward said detent is movable by rotary solenoid 183, which, when energized, alows motion of the driving gears for the rectangular support. The gear 180 is connected to a shaft 184 which has a gear 185 secured thereto. The gear 185 drives a reduction gear 186 which in turn meshes with a rack gear 187 which cooperates with rack 188. The shaft 184 is further connected to a potentiometer 189 which furnishes an output voltage indicative of the position of the carriage 172. The inner rectagular support 170 has in turn duplicate apparatus to that mentioned previously with respect to support 174 for its movement mounted on the rectangular support 172 so that each support is movable independently of the other.

The coordinate positioning apparatus is moved to various coordinate positions by applying voltage to the motors shown in FIG. 11. A suitable control for this type of arrangement is shown in patent application Serial Number 693,584, filed October 31, 1957, to D. Fryklund. The detents are removed by the solenoid when voltages are applied to the motors to allow movement.

The component selection magnets 12 are controlled by circuits which would include the magazine code plates 56 and 57. One set of input lines is connected to the contacts contained on one side of each slot in which a magazine 13 is contained. A second set of input lines is connected to the contacts on the opposite side of each slot and are grounded. Each selection magnet 12 is included in a circuit between the contacts on each side of each slot. When a particular line in the first set is energized, the contact 64 on the particular magazine having such a contact will complete a circuit through the lower contact 62, the selection magnet 12 associated with the slot in which this magazine is contained, to the lower contact 63 on the opposite side and subsequently to ground through contact 65.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for inserting any one of a plurality of components into an apertured board, a component selection slide movable in a vertical path, a plurality of component dispensing means angularly positioned on either side of said path, and means for operating one of said dispensing means to dispense a component into the path of said slide.

2. The apparatus of claim 1 wherein said means for operating said dispensing means comprises an electromagnet, an interposer responsive to the energization of said electromagnet for moving from a first to a second position, selection pawls positioned adjacent each said dispensing means for moving a component into the path of said slide and an actuating slide operable when said interposer is in said second position for moving said pawls.

3. A movable component selection slide for a component inserting machine comprising a pair of spaced selection fingers for securing a component therebetween, forming jaws mounted on either side of said selection fingers for positioning a component, each said forming jaw containing a spring for resiliently biasing said jaws and a pawl pin for each said jaw for normally securing said jaws in an immovable position.

4. The apparatus of claim 3 further including a pair of component forming fingers positioned in the path of said component slide and immediately adjacent said forming jaws wherein a component carried by said selection fingers will be formed into a desired configuration by said jaws and forming fingers.

5. In a multiple component insertion machine for inserting components into a member adapted to receive the same, comprising a component selection element operable to force a component into said member, means for moving said element in a path terminated by said member, a plurality of storage magazines located along said path, and means for ejecting a component from a magazine to a position in the path of said element whereby movement of the element along said path forces the selected component into said member.

6. The apparatus of claim 5 wherein each said magazine is angularly positioned on either side of said path.

7. The apparatus of claim 6 wherein said component selection element is movable in a reciprocating manner in said path and includes selection fingers positioned at the extreme end thereof for gripping a component positioned in said path.

References Cited in the file of this patent

UNITED STATES PATENTS

| | | |
|---|---|---|
| 2,772,416 | Dorosz | Dec. 4, 1956 |
| 2,856,998 | Hancock | Oct. 21, 1958 |
| 2,904,785 | Lawson | Sept. 22, 1959 |
| 2,911,646 | Vossen | Nov. 10, 1959 |

OTHER REFERENCES

"Mechanized Production of Miniature Electronic Packaged Subassemblies Using Modular Construction," Final Report, Feb. 28, 1953, Melpar Inc., Alexanderia, Va., pages 36 and 37.

Radio-Electronic Engineering, December 1953, pages 16, 17, 18, 38, 39.